Patented Mar. 27, 1934

1,952,871

UNITED STATES PATENT OFFICE 1,952,871

PROCESS OF MAKING SATURATED ACIDS, BY SIMULTANEOUS DISSOCIATION AND HYDROGENATION

Hans Kaufmann, Jena, Germany

No Drawing. Application November 13, 1929, Serial No. 406,975. In Germany December 27, 1928

6 Claims. (Cl. 87—12)

This invention relates to a process of making saturated acids, preferably from fats, and more particularly to a process of increasing the per cent in mixtures of fatty acids and consists essentially in combining the catalytic hydrogenation and the hydrolytic splitting into a single operation.

For many technical purposes saturated fatty acids are of greater importance than non-saturated fatty acids. Thus, for instance, in the candle-industry and partly also in the soap-industry there are preferably used the solid saturated acids which are obtained by splitting the fat. If it is desired to make use of natural fats which mainly contain liquid non-saturated acids (oils), said natural fats are first hydrogenized and thereupon the hardened fats are split off or worked into soaps.

An essential simplification of the process now is attained according to my invention by carrying out the hydrogenation as well as the process of splitting in a single step of operation. In the German Patent 126,446 and the further additional German Patent 132,223 there is described a process of splitting fatty substances and at the same time transforming liquid fatty acids into solid fatty acids by treating the fats with sulphuric acid and exposing the intermediary substances, that is the sulphuric acid ester of the fatty acids simultaneously to pressure, heat and electric current. It may be assumed that the produced solid fatty acids represent isomers of the non-saturated initial fatty acids in accordance with known methods for producing at room temperature solid isomers of the non-saturated acids. Also the short statements regarding the apparatus to be used would lead to the conclusion that the aforementioned methods appear to relate to the formation of solid acids from liquid acids. Apparently no hydrogenation takes place in this case.

It has further been found that the simultaneous splitting as well as the addition of hydrogen may be carried out in a technically suitable manner, if catalytic hydrogenation is employed. Due to the presence of considerable quantities of water and the formation of glycerine, conditions will arise which—like hydrogenation in a two-phase system in general—are quite different from the conditions which prevail when using the ordinary process of hardening fat. According to the present opinion of experts the presence of relatively large quantities of water will have an unfavorable effect upon the hardening (see, for instance, Ubbelohde "Handbuch der Chemie und Technologie der Oele und Fette", Liepzig 1928, volume IV, page 309, third from last line). It has also been so far the opinion of experts that losses would eventually take place due to the formation of compounds with the catalyst. There is further the general opinion among experts that glycerine is a catalyst poison. Therefore either failure of the catalyst during the course of the process of hardening, the degree of failure of the catalyst increasing with the formation of glycerine, or also a loss of said catalyst due to formation of a compound with the fatty acids was to be expected according to the general opinion. As a matter of surprise I have found that neither said failure of the catalyst nor said formation of a compound takes place. In particular I have ascertained that nickel will not be dissolved by fatty acids in an atmosphere of hydrogen, if water-steam of high temperature is present. In case soaps of nickel should be formed, they may be split hydrolytically and the hydroxide will at once be reduced to metal. Nor does a poisoning of the catalyst take place and on the contrary I have found that the catalyst may be used without reactivation a great many times, if the fats are previously carefully purified.

When carrying out the process according to my invention, all ordinary methods of splitting and likewise all well-known methods of catalytic hydrogenation for instance with catalysts of nickel may be used. The process may be carried through after the reaction mass had been supplied with the catalyst and by passing hydrogen (or a gas containing hydrogen) through said reaction mass. The degree of splitting is dependent upon the quantity of the splitting agent, upon the duration of the process as well as upon the temperature. Hardening is regulated, besides temperature and pressure of the hydrogen, by the quantity and quality of the catalyst. Considering these facts there may be made mixtures of saturated and non-saturated acids of a desired composition, from oils, in case a complete hydrogenation is not desired. The presence of hydrogen, in addition, is connected with the advantage that reactions due to decomposition—which will result in darkening the acids produced—may be effectively prevented, even at high pressures and temperatures. Furthermore, the heat which is developed by exothermic reaction during hydrogenation may be made available for the process of splitting. When using water-steam in condition of flow, said steam mixed with hydrogen may be continuously circulated through the fat which is supplied with the catalyst. Also the fat mixed with the catalyst may be atomized in an atmosphere of hydrogen and water-steam. The process of working-up the reaction mass may be carried out in that said reaction mass is allowed to settle in several layers by cooling under pressure or by passing said reaction mass in still hot condition through suitable filters, thereupon causing said mass to settle, separating the solidifying fatty acids in the ordinary manner and further working said fatty acids. If alkaline substances are used for the process of splitting, there will be formed the soap (or mixtures of soap) of of the fatty acids produced by splitting and hardening.

*Examples*

1. 10 parts of oil acid methyl ester and 5 parts of water are caused to interact in a stirring digestor with 0.2 part of magnesium oxide and 2 parts of a nickel infusorial silica catalyst (Ni—contents 20%) and the air is driven out of the apparatus by hydrogen. The mixture is heavily agitated and now warmed to a temperature of about 200°, the consumed hydrogen being replaced from time to time. Samples which may be taken out of the mixture prove the fact that stearic acid will be present after a short time in the reaction mass, the quantity of said stearic acid increasing constantly as the process is continued. The samples should be shaken through with ether after having become acid. After 3 hours the iodine number decreased to 40 and the acid number increased to 121; after 6 hours the iodine number was 15 and the acid number 165. The same result is attained if a catalyst containing palladium-chloride is employed.

2. 100 parts of cotton oil, previously purified in the ordinary manner, and 100 parts of water are caused to interact with 2 parts of zinc oxide and 10 parts of a nickel carbon catalyst (Ni—contents 20%). Thereupon the apparatus is placed under hydrogen at a pressure of 10 atmospheres and heated to a temperature of about 200°. As early as after a few hours the splitting assumes a percentage of approximately 90% of free fatty acids the iodine number of which is half as large as that of the original oil.

3. 100 parts of earth-nut oil and 50 parts of water are caused to interact with 5 parts of a nickel infusorial silica catalyst (Ni—contents 20%) and warmed while being well caused to interact in a hydrogen atmosphere to a temperature of 180–200°. After three hours a product will be obtained which contains 75% of free acids and having its melting point at 50°.

4. 100 parts of linseed oil (iodine number 178) together with 50 parts of water are heated with the addition of 10 parts of a nickel infusorial silica catalyst (Ni—contents 20%) in a stream of hydrogen to a temperature of about 200°. After five hours there will have been produced 90% of free acids having an iodine number 64.

5. 100 parts of maize oil (iodine number 113) together with 100 parts of water and 10% of a nickel infusorial silica catalyst (Ni—contents 10%) are heated in a hydrogen atmosphere for two hours to a temperature of 200°. The product of reaction has the acid number 165 in accordance with a content of 87% of free acid and the iodine number 17.

6. The fact that with smaller quantities of a catalyst and some longer time of heating the conditions according to Example 5 may be varied to obtain stronger splitting and smaller hydrogenation is proven by the following composition:

Maize oil (iodine number 110.7) with the addition of 0.15% of nickel, related to the quantity of fat, in the form of a 10% catalyst, and 150% of water having a temperature of from 200–210° and a pressure of from 25–30 atmospheres.

| Time | Percent of free acids | Iodine number | Consistency or melting point |
| --- | --- | --- | --- |
|  | 1.5 | 110.7 | Liquid |
| 30 minutes | 2.5 | 107.5 | Liquid |
| 1 hour | 20.4 | 105.9 | Gloomy |
| 1½ hours | 36.2 | 98.5 | Semi-liquid |
| 2½ hours | 73.5 | 83.8 | Greasy |
| 3½ hours | 89.6 | 77.2 | 35–37° |
| 4½ hours | 95.6 | 72.0 | 38–40° |
| 5½ hours | 98.2 | 68.3 | 42–43° |

I claim:

1. The process of making fatty acids by dissociating fats and oils which consists in decomposing fats and oils into free fatty acids and glycerine by means of water, and simultaneously hydrogenating the product catalytically.

2. The process of making fatty acids by dissociating fats and oils which consists in decomposing fats and oils into free fatty acids and glycerine, by means of water, and simultaneously hydrogenating the product by means of a nickel-containing catalyst and free hydrogen.

3. The process of treating esters of lower monovalent alcohols which consists in decomposing said substances, by means solely of water, and simultaneously catalytically hydrogenating the products.

4. The process of treating esters of fatty acids which consists in hydrolyzing said esters, by means of water, and simultaneously catalytically hydrogenating the products, said procedure being continued until the fatty acids are completely converted into saturated products.

5. The process of treating fatty acids which consists in dissociating said acids by hydrolysis, solely by means of water, and simultaneously catalytically hydrogenating the resulting products, said hydrolysis and hydrogenation procedures being continued until a mixture of saturated and unsaturated acids is obtained.

6. The process of making fatty acids by dissociation of fats and oils which consists in decomposing fats and oils into free fatty acids and glycerine, by means of water, and simultaneously hydrogenating the product by supplying free hydrogen thereto in the presence of a suitable hydrogenation catalyst.

HANS KAUFMANN.